United States Patent [19]

Wosmek

[11] 4,062,306
[45] Dec. 13, 1977

[54] APPARATUS FOR DISTRIBUTING AGRICULTURAL AMMONIA

[75] Inventor: Raymond A. Wosmek, Glencoe, Minn.

[73] Assignee: AG Systems, Inc., Hutchingson, Minn.

[21] Appl. No.: 753,550

[22] Filed: Dec. 22, 1976

[51] Int. Cl.² .............................................. F23B 1/28
[52] U.S. Cl. ....................................... 111/7; 239/569; 251/12; 251/298; 251/143; 137/527
[58] Field of Search ............ 111/6, 7; 251/12, 58–60, 251/143, 298; 137/251, 527; 239/569, 574, 578, 579, 581, 582, 99

[56] References Cited

U.S. PATENT DOCUMENTS

| 2,743,897 | 5/1956 | Elliott et al. | 251/60 X |
| 2,757,827 | 8/1956 | Russell | 111/7 |
| 2,932,314 | 4/1960 | Stephens | 251/143 X |
| 3,409,033 | 11/1968 | Johnston | 111/7 X |
| 3,533,595 | 10/1970 | Gizeski | 251/58 X |
| 3,556,027 | 1/1971 | Ammann | 111/7 X |
| 3,736,890 | 6/1973 | Barnes | 111/7 |
| 3,887,161 | 6/1975 | Kubelka, Jr. | 251/58 |

FOREIGN PATENT DOCUMENTS

| 227,848 | 4/1960 | Australia | 111/7 |
| 1,582,076 | 8/1970 | Germany | 111/7 |

*Primary Examiner*—E. H. Eickholt
*Attorney, Agent, or Firm*—Merchant, Gould, Smith, Edell, Welter & Schmidt

[57] ABSTRACT

Improved apparatus fo use in distributing anhydrous ammonia for agricultural applications, including a compact, convenient assembly combining in a single portable unit a flow meter, a control valve, a rotary fluid motor, an ammonia input, and means for mounting the assembly on any available application implement for connection to the ammonia source, the ammonia applicators, and the power fluid from a towing tractor.

3 Claims, 3 Drawing Figures

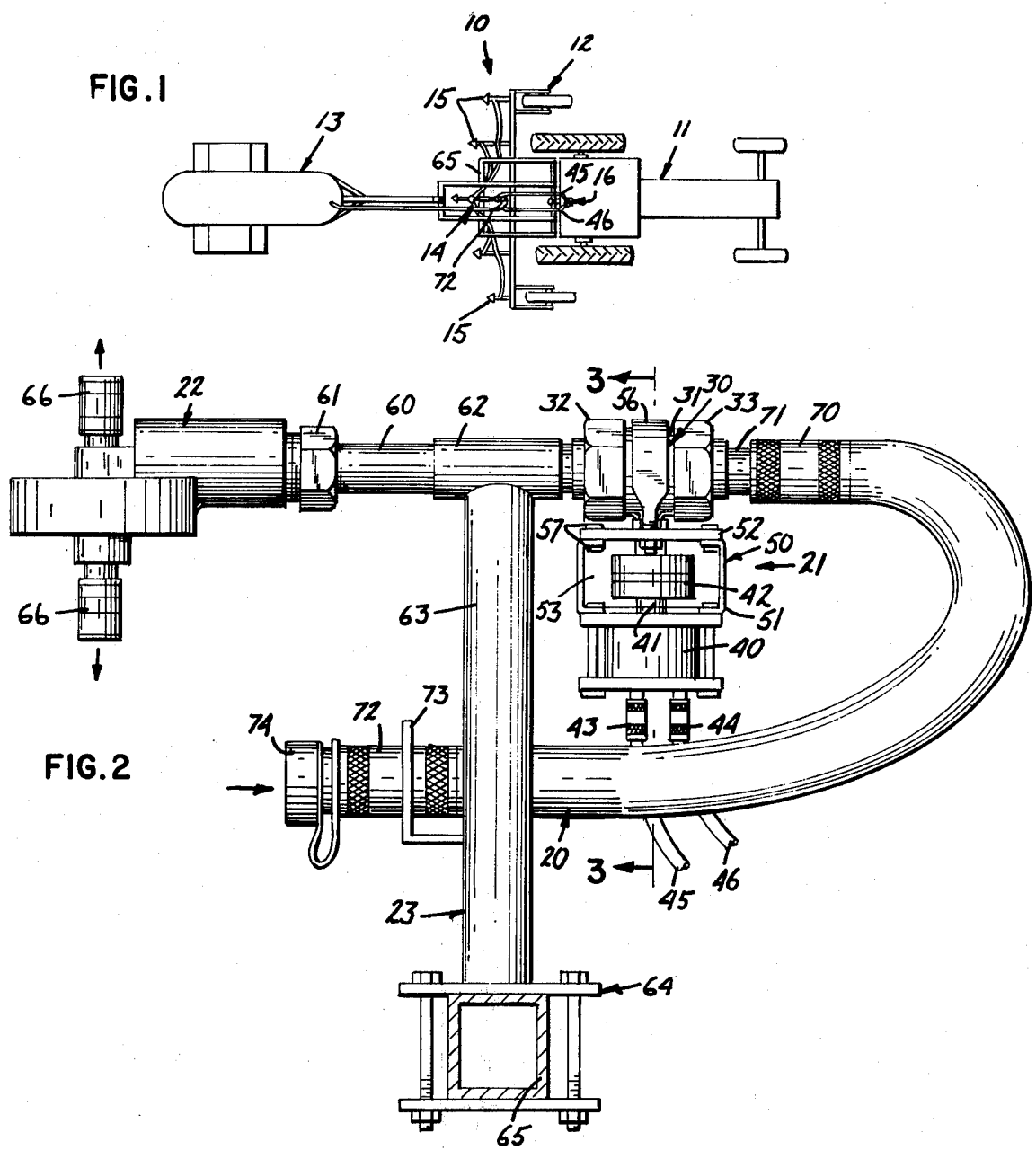
FIG. 1
FIG. 2
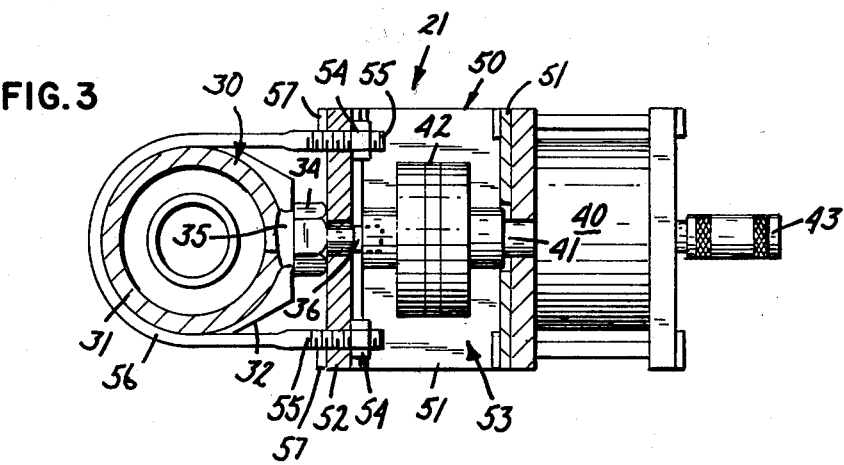
FIG. 3

APPARATUS FOR DISTRIBUTING AGRICULTURAL AMMONIA

BACKGROUND OF THE INVENTION

This invention relates to the field of agricultural engineering, and particularly to an improvement in apparatus for distributing anhydrous ammonia as a fertilizer to the soil.

Such apparatus normally includes a wheeled supply tank, a wheeled implement having applicators to deposit the ammonia in the soil, means whereby the implement is drawn behind a vehicle such as a tractor and the tank is drawn behind the implement, a flow meter to regulate the flow of ammonia to the applicators, piping and hose connecting the tank to the meter and the meter to the apparatus, and means actuable by the tractor operator for controlling the flow of ammonia from the tank to the flow meter.

One arrangement known for this purpose is shown in U.S. Pat. No. 3,905,323 to Ahlers, et al., which teaches the use of an arrangement mounted on the implement and including a rotary valve and a linear fluid motor connected to actuate the valve, under the control of the tractor operator, from the hydraulic console of the tractor. This arrangement has numerous advantages pointed out by the patentee, but also suffers from some disadvantages.

In the first place, the conversion of the linear motion of the fluid motor into rotary motion of the valve, while mechanically conventional, occupies an unnecessarily large space and has moving parts of considerable dimensions located in the open for easy interference by trash from the field of other adventitious objects. In the second place, the structure of the patent is all permanently mounted on the implement, so that if a farmer has more than one application implement, he must also have the same plurality of fluid motors, control valves, and regulators, even though a single ammonia tank can be used with any of the implements. Yet another defect is that the piston of a linear fluid motor is exposed to the dust and other abrasives of the environment and so is subject to severe wear.

SUMMARY OF THE INVENTION

The present invention comprises a novel assembly of the essential interconnecting components of a system as described, particularly designed for minimum size and weight to foster interchangeable installation on any application implement, and for maximized resistance to damage by abrasion. If a farmer has certain fields on which only a narrow implement must be used and other fields on which a wider implement may be used, only one combined control valve, fluid motor, and regulator valve need be purchased, as it can be used, like the farmer's tractor and his tank vehicle, from implement to implement.

Various advantages and features of novelty which characterize my invention are pointed out with particularlity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing FIG. 1 is a plan view of fertilizing apparatus incorporating the invention;
FIG. 2 is a side view of the inventive apparatus and;
FIG. 3 is a sectional view generally along the line 3—3 of FIG. 2, parts being shown in full.

DESCRIPTION OF THE PREFERRED EMBODIMENT

As shown in FIG. 1, a system 10 for application of anhydrous ammonia as a fertilizer comprises a tractor 11 drawing an applicator implement 12, a tank 13, here shown as provided with its own wheels and as drawn behind implement 12, and an assembly 14 for connecting tank 13 to applicators 15 of the implement to provide controlled discharge of the ammonia to the ground, the control being in part exercised by the tractor operator through a conventional valved connection 16 to the hydraulic system of the tractor.

Assembly 14 is shown in FIG. 2 to comprise as principal components an input hose 20, a power actuated valve assembly 21, a flow regulator 22, and a support bracket 23. The various components are of small dimensions and are assembled to occupy little space and to be easily moved as an assembly from one implement to another.

Valve assembly 21 is designed for valving fluids under pressure, and any valve suitable for this purpose may be used. The valve 30 in FIGS. 2 and 3 includes a body 31 tapped at its ends to receive a pair of solder-type tubing connectors 32 and 33, and having a cap 34 screwed on to a neck 35 of the body to compress suitable packing, not shown, about a stem 36. Stem 36 is rotatable about its axis through approximately ninety degrees between open and closed positions in which it enables and prevents respectively, passage of fluid through the valve from right to left as seen in FIG. 2: mechanical stops are provided in valve 30 to limit the rotation of stem 36 at the extremes of its travel.

A rotary fluid motor 40 is provided to cause rotation of stem 36, and has a shaft 41 coupled to stem 36 by a flexible coupling 42 of conventional construction. Power fluid connections are made to motor 40 at 43 and 44, which are connected by hoses 45 and 46 to tractor connection 16. Motor 40 is supported from valve 30 on a frame 50 which encloses coupling 42 on four sides, and comprises a channel member 51 and a plate 52. Motor 40 is mounted on channel member 51 with its shaft 41 projecting through member 51, into the space 53 defined by the frame and plate 52, and plate 52 is clamped against cap 34 of valve 30, by nuts 54 secured to threaded extension 55 of a strap 56 encircling valve body 31, so that the stem 36 also projects into the space 53, through plate 52. Plate 52 member 51 are secured together by fasteners 57 with shaft 41 and stem 36 substantially coaxial, to permit their interconnection by coupling 42.

A tube 60 carried at one by connector 32 is provided at its other end with a connector 61 by which it is joined to flow regulator 22, which is of conventional structure. Tube 60 is mounted in a support tube 62 carried on a standard 63 to comprise a portion of bracket 23, which is provided at its other end with means 64 for clamping the bracket to a frame member 65 of implement 12. Regulator 22 is provided with connections 66 to receive hoses leading to the various applicators 15 of implement 12.

Input hose 20 has at one end a connection 70 to a tube 71 carried by connector 33. At its other end, hose 20 includes a connector 72 for connecting the tube to the customary self-closing supply connection to tank 13. Connector 72 is supported in a bracket 73 on standard 63, and may be provided with a removably cap 74 for preventing unwanted material from entering hose 20.

OPERATION

To use the apparatus described above, the farmer selects the application implement 12 appropriate to the field he intends to fertilize, couples it to his tractor 11, and couples thereto the wheeled tank 13. Using clamp 64 he fastens assembly 14 to frame 65 of the implement, and connects the applicator hoses to regulator 22. He connects hoses 45 and 46 to his tractor hydraulic system and actuates the appropriate tractor valve to cause operation of motor 40 so that valve 30 closes, if it is not already closed. Next, he removes cap 74 and connects hose 20 to supply ammonia from tank 13. During travel of the apparatus to the field to be worked, no ammonia passes valve 30 to affect regulator 32. When he is ready to fertilize a field, and has positioned applicators 15 at the proper depth below ground surface, he operates his tractor hydraulic system to apply power fluid through hose 45, the fluid returning through hose 46. Motor 40 operates to open valve 31, and ammonia flows to regulator 22 and thence to applicators 15. Since no flow control adjustments are made to regulator 22 itself, the service life of the regulator is greatly increased.

Shortly before the end of a pass across the field, the tractor operator operates motor 40 through hose 46 to close valve 30. The applicators may now be raised with little loss of ammonia, the apparatus turned, the applicators reset, and the valve reopened to reinstate ammonia flow to the soil.

From the foregoing, it will be evident that I have invented a new and useful assembly and an improved apparatus for using the same. The assembly is easily moved from one implement to another, occupies little space, and is considerably protected against damage by the abrasive dust incident to the farming business.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. In agricultural apparatus for delivering a liquid under pressure from a container to an array of implement applicators drawn through the soil by a traction vehicle having a source of power fluid, the improvement which comprises:
   connection means between said container and said applicators including a valve having a body and a stem rotatable in the body;
   a rotary fluid motor;
   means mounting said motor on said body in driving relation to said stem;
   and means controlling the supply of power fluid to said motor to cause opening and closing of said valve.

2. An assembly for use in distributing agricultural ammonia comprising, in combination:
   a valve having a body and a stem rotatable in the body;
   a rotary fluid motor;
   means, including a strap around said body and a flexible coupling engaging said stem, for connecting said motor in driving relation to said valve;
   means for supplying power fluid to said motor to cause operation thereof;
   means for supplying ammonia to said valve and conducting ammonia passed by said valve;
   and means for removably mounting said assembly on an application implement.

3. Valving apparatus comprising, in combination:
   a valve including a body and a stem rotatable in said body between open and closed valving positions;
   a rotary fluid motor having a drive shaft;
   a hollow frame;
   means including a strap surrounding said body for mounting said valve with said stem projecting into said frame;
   means mounting said motor on said frame with said drive shaft extending toward and substantially coaxial with aid stem;
   and a flexible coupling within said frame and connecting said shaft in driving relation to said stem.

* * * * *